US012017473B2

(12) United States Patent
Tsegenidis et al.

(10) Patent No.: US 12,017,473 B2
(45) Date of Patent: Jun. 25, 2024

(54) WRITING INSTRUMENTS

(71) Applicant: BIC VIOLEX S.A., Anoixi (GR)

(72) Inventors: Anestis Tsegenidis, Anoixi (GR); Georgios Paspatis, Anoixi (GR); Dimitrios Panselinas, Anoixi (GR)

(73) Assignee: BIC Violex Single Member S.A., Anoixi (GR)

( * ) Notice: Subject to any disclaimer, the term of this patent is extended or adjusted under 35 U.S.C. 154(b) by 130 days.

(21) Appl. No.: 17/651,084

(22) Filed: Feb. 15, 2022

(65) Prior Publication Data

US 2022/0297467 A1 Sep. 22, 2022

(30) Foreign Application Priority Data

Mar. 16, 2021 (EP) .................................... 21162808

(51) Int. Cl.
*B43K 7/12* (2006.01)
*B43K 24/02* (2006.01)

(52) U.S. Cl.
CPC ................ *B43K 7/12* (2013.01); *B43K 24/02* (2013.01)

(58) Field of Classification Search
CPC . B43K 7/12; B43K 24/02; B43K 7/00; B43K 7/02; B43K 24/00
See application file for complete search history.

(56) References Cited

U.S. PATENT DOCUMENTS 3,233,592 A * 2/1966 Bross .................. B43K 24/023 401/31
3,260,241 A 7/1966 Bross
6,309,122 B1 * 10/2001 Wang .................... B43K 24/02 401/109
6,860,667 B2 3/2005 Dowst et al.
2008/0267687 A1 * 10/2008 Blair ..................... B43K 7/005 401/103
2015/0063893 A1 * 3/2015 Oomoto ............... B43K 23/008 401/62

FOREIGN PATENT DOCUMENTS

DE 1248509 B 8/1967
DE 1461284 A1 3/1972
KR 19980016485 * 6/1998
KR 19980016485 U 6/1998

OTHER PUBLICATIONS

Extended European search report in European Application No. 21162808.6, dated Aug. 12, 2021 (8 pages).
Promotional Senator New Spring Clear Plastic Ballpen with metal clip & metal barrel from Fluid Branding | Metal Pens; https://www.fluidbranding.com/senator-new-spring-clear-plastic-ballpen-with-metal-clip-and-metal-barrel-1287829892.html.

* cited by examiner

*Primary Examiner* — J C Jacyna
(74) *Attorney, Agent, or Firm* — Bookoff McAndrews, PLLC

(57) ABSTRACT

A writing instrument may include an elongated tubular casing, an elongated writing medium cartridge and a tubular elastic spring element. The tubular elastic spring element comprises a first portion and a second portion. The second portion comprises a wall comprising a plurality of apertures.

18 Claims, 4 Drawing Sheets

WRITING INSTRUMENTS

This application claims benefit from European patent application EP21162808.6, filed on 16 Mar. 2021, its content being incorporated herein by reference.

TECHNICAL FIELD

The present disclosure relates to the field of writing instruments, in particular to retractable writing instruments.

BACKGROUND

Writing instruments, such as retractable pens, are known to comprise complex mechanisms including parts like spring-loaded ink cartridges which retract and extend outside a protective housing. Several types of actuation mechanisms such as latch mechanisms or cam mechanisms exist to extend and hold the writing tip of the ink cartridge outside the protective housing for writing. In addition, a metal spring commonly arranged at the tip of the ink cartridge provides the tension needed to retract the ink cartridge when the actuation mechanism is released from the extended position. Those type of systems involve many parts, which need to be assembled. As a result, the manufacturing cost and time needed stand in high level.

The object of the present disclosure is to provide a simple mechanism for the retraction and extension of a writing medium cartridge of a writing instrument with a low number of parts being assembled together.

SUMMARY

The present disclosure relates to a writing instrument, a cartridge assembly, a writing instrument and a method of manufacturing a tubular elastic spring element. The dependent claims depict embodiments of the present disclosure.

According to one aspect of the present disclosure, a writing instrument comprises an elongated tubular casing, an elongated writing medium cartridge and a tubular elastic spring element. The tubular elastic spring element comprises a first portion and a second portion. The second portion comprises a wall comprising a plurality of apertures.

Embodiments of the tubular elastic spring element can include any one or more of the following features.

The second portion may comprise a net structure or a net-like structure. More particularly, the plurality of apertures may be arranged as a net structure or as a net-like structure. A net structure or net-like structure generally comprises a wall with apertures or holes, which may be arranged in any geometrical or non-geometrical pattern. A net or net-like structure provides a guided deformation of the spring along the longitudinal axis. A net structure or net-like structure can be for example be in form of a woven material. The term 'woven' is not intended to be limiting to any weaving pattern or threading or knotting. Rather, 'woven' is understood as any arrangement of material, which forms a wall with apertures or holes. The net structure or net-like structure can in addition or alternatively be in form of a cell grid, wherein the shape and the arrangement of the cells to form the grid can be chosen in a way to simultaneously provide a certain elasticity and mechanical properties to the material, such that it can be deformed.

A central axis of at least one of the apertures may extend perpendicularly to the longitudinal axis of the spring element. Alternatively or in addition, a central axis of at least one of the apertures may extend radially with an angle from the longitudinal axis of the spring element. Further, the at least some of the apertures may have the same shape, in particular substantially all apertures may have the same shape. Alternatively or in addition, at least some of the apertures may have different shapes, in particular substantially all apertures may have a different shape.

Further, a thickness of the wall of the second portion may be constant over a length of the second portion. Alternatively or in addition, the thickness of the wall of the second portion may vary over a length of the second portion.

The first portion may comprise a first material and the second portion may comprise a second material. The first material may be more rigid than the second material. Alternatively or in addition, the first portion and the second portion of the spring element may form an integral part. The first portion and the second portion may be arranged longitudinally to each other. Further, the spring element may have a closed shape or an open shape.

In embodiments, the spring element may be configured to change from a relaxed state to a contracted state when it is subjected to a compression force in the longitudinal direction. The spring element may be configured to revert from the contracted state to the relaxed state when the compression force in the longitudinal direction is released. In the contracted state, the second portion of the spring element may be deformed such that the total length of the spring element is reduced compared to the length of the second portion in the relaxed state.

The first portion of the spring element may comprise a polymer, in particular a hard plastic or a photopolymer resin. The second portion may comprise an elastomer, in particular a natural or a synthetic elastomer. The material of the second portion may have a shore A hardness between 0 and 90, more specifically between 20 and 85, in particular between 40 and 80. The set of apertures arrangement (number, dimensions, shape etc.) of the second portion along with the shore A hardness of the second material contributes to determine the force needed for the compression of the spring element.

The spring element according to the present disclosure, including for example an elastic netting or netting-like structure made of soft plastic, such as rubber, and/or presenting several apertures on its softer second portion works like a metallic spring as known in the field. The spring element may present elastic deformation properties such that it can be deformed when subjected to external forces and recovers its initial shape when released. With this, it can, when assembled in a retractable writing instrument as described above, work as a spring for the retraction and extension of the writing medium cartridge (e.g. ink cartridge). The elastic characteristic of the spring element according to the present disclosure substitutes the original metal spring necessity. The use of a tubular elastic spring element as disclosed provides for enhanced control of the force needed for the extension and the retraction of the writing medium cartridge, as wells as the speed with which the writing medium cartridge will extend and retract within the casing of the writing instrument.

The spring element may be manufactured by an additive manufacturing process, for example 3D-printing.

Further, the spring element may be arranged around a portion of the writing medium cartridge. In addition or alternatively, the spring element may be arranged within the casing.

Embodiments of the writing instrument may include any one or more of the following features.

The casing may comprise a shoulder on its inner surface. The second portion of the spring element may face the inner shoulder in the casing.

In addition or alternatively, the casing may comprise a wall comprising a plurality of apertures, wherein the plurality of apertures of the casing may face the plurality of apertures of the spring element. The arrangement and shapes of the plurality of apertures of the casing may correspond in projection to the arrangement and shapes of the plurality of apertures of the spring element. The dimensions of each aperture of the casing may correspond to the dimensions of the corresponding facing aperture of the spring element. Alternatively or in addition, the dimensions of each aperture of the casing may be a projection of the dimensions of the corresponding facing aperture of the spring element.

The casing may be manufactured by an additive manufacturing process, for example 3D-printing.

In embodiments, the spring element and the casing may form an integral part. Herein, a distal end of the end portion of the spring element may be integral with a proximal end of the shoulder of the casing, and a gap may be present between the outer perimeter of the spring element and the inner perimeter of the casing.

The casing and the spring element may be integrally formed, in particular by an additive manufacturing process, for example 3D-printing.

Further, the casing may comprise a polymer, in particular a hard plastic or a photopolymer resin.

The writing medium cartridge may comprise a writing tip at a distal end and the casing may surround the writing medium cartridge and the spring element, such that the writing medium cartridge may be slidable within the casing and the spring element in the longitudinal direction. Herein the writing medium cartridge may comprise a shoulder on its outer surface configured to abut the end surface of the first portion of the spring element.

In a first position, the spring element may be in the relaxed state and, in a second position, the spring element may be in the contracted state. Further, in the second position, the spring element may be compressed between the shoulder of the casing and the shoulder of the writing medium cartridge.

In embodiments, the writing instrument may include any one or more of the following features.

The writing medium cartridge may comprise a shoulder on its outer surface. Moreover, the second portion of the spring element may face the shoulder on the writing medium cartridge. In embodiments, the shoulder of the writing medium cartridge may comprise a groove directed in the longitudinal direction towards the distal end of the writing medium cartridge. An end portion of the second portion of the spring element may be arranged in the groove.

The writing medium cartridge may be manufactured by an additive manufacturing process, for example 3D-printing.

The spring element and the writing medium cartridge may form an integral part. Herein, a proximal end of the second portion of the spring element may be integral with a distal end of the shoulder on the writing medium cartridge, and a gap may be present between the inner perimeter of the spring element and the outer perimeter of the writing medium cartridge. Alternatively or in addition, an end portion of the second portion of the spring element may be integrated in the groove of the writing medium cartridge, and a gap may be present between the inner perimeter of the spring element and the outer perimeter of the writing medium cartridge.

The integral part formed by the spring element and the writing medium cartridge may be manufactured by an additive manufacturing process. Herein, the writing medium cartridge may comprise a polymer, in particular a hard plastic.

In a further embodiment, the elongated tubular casing may surround the writing medium cartridge and the spring element, such that the writing medium cartridge and the spring element may be slidable within the casing in the longitudinal direction. The casing may further comprise a shoulder on its inner surface such that the end surface of the first portion of the spring element may face the shoulder on the casing.

In a first position, the spring element may be in the relaxed state and, in a second position, the spring element may in the contracted state. Further, in the second position, the spring element may be compressed between the shoulder of the casing and the shoulder of the writing medium cartridge.

According to another aspect of the present disclosure, a cartridge assembly for a writing instrument comprises an elongated writing medium cartridge comprising a writing tip at a distal end, and a tubular elastic spring element. The tubular elastic spring element comprises a first portion and a second portion. The second portion comprises a wall comprising a plurality of apertures.

The first portion and the second portion of the spring element may form an integral part. The first portion and the second portion may be arranged longitudinally to each other. Further, the spring element may have a closed shape or an open shape. Moreover, the first portion may comprise a first material and the second portion may comprise a second material. The first material may be more rigid than the second material.

The second portion may comprise a net structure or a net-like structure. More particularly, the plurality of apertures may be arranged as a net structure or as a net-like structure. A net structure or net-like structure generally comprises a wall with apertures or holes, which may be arranged in any geometrical or non-geometrical pattern. A net or net-like structure provides a guided deformation of the spring along the longitudinal axis. A net structure or net-like structure can be for example be in form of a woven material. The term 'woven' is not intended to be limiting to any weaving pattern or threading or knotting. Rather, 'woven' is understood as any arrangement of material, which forms a wall with apertures or holes. The net structure or net-like structure can in addition or alternatively be in form of a cell grid, wherein the shape and the arrangement of the cells to form the grid can be chosen in a way to simultaneously provide a certain elasticity and mechanical properties to the material, such that it can be deformed.

A thickness of the wall of the second portion may be constant over a length of the second portion. Alternatively or in addition, the thickness of the wall of the second portion may vary over a length of the second portion.

A central axis of at least one of the apertures may extend perpendicularly to the longitudinal axis of the spring element. Alternatively or in addition, a central axis of at least one of the apertures may extend radially with an angle from the longitudinal axis of the spring element. Further, the at least some of the apertures may have the same shape, in particular substantially all apertures may have the same shape. Alternatively or in addition, at least some of the apertures may have different shapes, in particular substantially all apertures may have a different shape.

In embodiments, the spring element may be configured to change from a relaxed state to a contracted state when it is subjected to a compression force in the longitudinal direction. The spring element may be configured to revert from the contracted state to the relaxed state when the compression force in the longitudinal direction is released. In the contracted state, the second portion of the spring element may be deformed such that the total length of the spring element may be reduced compared to the length of the second portion in the relaxed state.

The first portion of the spring element may comprise a polymer, in particular a hard plastic or a photopolymer resin; the second portion may comprise an elastomer, in particular a natural or a synthetic elastomer. The second portion of the spring element may have a shore A hardness between 0 and 90, more specifically between 20 and 85, in particular between 40 and 80.

The spring element may be manufactured by an additive manufacturing process, for example 3D-printing.

Further, the spring element may be arranged around a portion of the writing medium cartridge.

Embodiments of the cartridge assembly may include any or more of the following features.

The writing medium cartridge may comprise a shoulder on its outer surface. The second portion of the spring element may face the shoulder on the writing medium cartridge. Further, the shoulder of the writing medium cartridge may comprise a groove directed in the longitudinal direction towards the distal end of the writing medium cartridge. In embodiments, an end portion of the second portion of the spring element may be arranged in the groove.

The writing medium cartridge may be manufactured by an additive manufacturing process, for example 3D-printing.

In embodiments, the spring element and the writing medium cartridge may form an integral part. Herein, a proximal end of the second portion of the spring element may be integral with a distal end of the shoulder on the writing medium cartridge, and a gap may be present between the inner perimeter of the spring element and the outer perimeter of the writing medium cartridge. Alternatively or in addition, an end portion of the second portion of the spring element may be integrated in the groove of the writing medium cartridge, and a gap may be present between the inner perimeter of the spring element and the outer perimeter of the writing medium cartridge.

The integral part formed by the spring element and the writing medium cartridge may be manufactured by an additive manufacturing process, for example 3D-printing.

Further, the writing medium cartridge may comprise a polymer, in particular a hard plastic.

According to another aspect of the present disclosure, a writing instrument comprises the cartridge assembly according to the embodiments as described above, and an elongated tubular casing surrounding the cartridge assembly, such that the cartridge assembly is slidable within the casing in the longitudinal direction. The casing comprises a shoulder on its inner surface such that the end surface of the first portion of the spring element faces the shoulder on the casing.

According to the embodiments as described above, in a first position, the spring element may be in a relaxed state and, in a second position, the spring element may be in a contracted state.

In the second position, the spring element may be compressed between the shoulder of the casing and the shoulder of the writing medium cartridge.

According to another aspect of the present disclosure, a writing instrument comprises an elongated tubular casing, a writing medium cartridge arranged within the casing and comprising a writing tip at a distal end, an actuating mechanism configured to translate the writing medium cartridge between a first position and a second position, and a tubular elastic spring element configured to bias the writing medium cartridge in the second position. The spring element comprises a first portion and a second portion. The second portion comprises a wall comprising a plurality of apertures.

In an embodiment, the first portion may comprise a first material and the second portion may comprise a second material. The first material may be more rigid than the second material.

The spring element may be arranged within the casing and around a portion of the writing medium cartridge. In the first position, the writing tip may be situated within the casing.

The writing instrument can further comprise an actuation element configured to actuate the actuation mechanism. The actuation element may be connected to the actuating mechanism. The actuating mechanism may further be arranged within the casing. Moreover, the actuating mechanism may be arranged at a proximal end of the writing medium cartridge.

According to another aspect of the present disclosure, a method of manufacturing a tubular elastic spring element for a writing instrument is provided, wherein the tubular elastic spring element comprises a first portion and a second portion. The second portion comprises a wall comprising a plurality of apertures. The method comprises an additive manufacturing process.

In an embodiment, the first portion may comprise a first material and the second portion may comprise a second material. The first material may be more rigid than the second material.

According to another aspect of the present disclosure, a method of simultaneously manufacturing a tubular elastic spring element for a writing instrument and an elongated tubular casing for a writing instrument is provided, wherein the spring element and the casing form an integral part. The method comprises an additive manufacturing process.

In an embodiment, the second portion of the spring element may comprise a wall comprising a plurality of apertures, wherein the casing may comprise a wall comprising a plurality of apertures, wherein the plurality of apertures of the casing may be facing the plurality of apertures of the spring element, and wherein the plurality of apertures of the casing may be a projection of the plurality of the apertures of the spring element.

According to another aspect of the present disclosure, a method of simultaneously manufacturing a tubular elastic spring element for a writing instrument and an elongated writing medium cartridge for a writing instrument is provided, wherein the spring element and the writing medium cartridge form an integral part. The method comprises an additive manufacturing process.

In an embodiment, the second portion of the spring element may comprise a wall comprising a plurality of apertures.

From a writing instrument perspective, the present disclosure permits a quicker manufacturing process, as less parts can be used, the complexity of the parts and sub-assemblies is reduced, which leads to an easier assembly. Further, the writing medium cartridge can be easily refilled. Additionally, the structure is overall simplified. Concerning the manufacturing of the components and assemblies disclosed, these can be for example be 3D-printed in one go, means hard and soft plastic simultaneously. In aspects, due to the absence of a metallic spring, the weight of the elements and assemblies is lighter compared to the known elements in the field.

DESCRIPTION OF THE DRAWINGS

Additional details and features of the disclosure are described in reference to the following figures in which.

DETAILED DESCRIPTION

Figure 1:
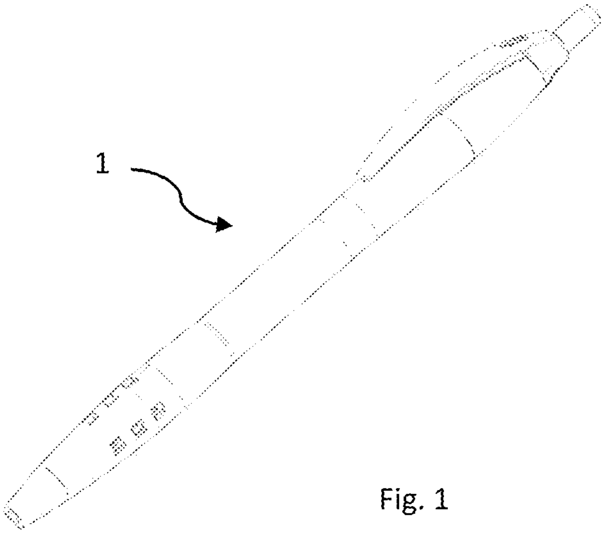
FIG. 1 is a schematic view of a writing instrument.

Embodiments of the writing instruments, the assemblies and the manufacturing methods thereof will be described in reference to the figures as follows.

A first embodiment of a writing instrument according to the present disclosure is illustrated in FIGS. 1 to 4. In this first embodiment, the writing instrument 1 comprises an elongated tubular casing 11, an elongated writing medium cartridge 12 and a tubular elastic spring element 10. The characteristics and functionalities of the tubular elastic spring element 10 as for example shown in FIGS. 3 and 4 will now be described more in detail.

The tubular elastic spring element 10 comprises a first portion 101 and a second portion 102. The first portion 101 may comprise a first material and the second portion 102 may comprise a second material, wherein the first material may be more rigid than the second material. The first material may be the same material as the material of the elongated tubular casing 11. This serves for a less complex manufacturing without the need of too many different materials. As represented, the first portion 101 and the second portion 102 are arranged longitudinally to each other. Additionally, the first portion 101 and the second portion 102 form an integral part, and the spring element 10 has a closed shape, such as to have one single tubular element. In examples not illustrated by the figures, the spring element may have an open shape, such as for example an elongated C form open in the longitudinal direction.

The second portion of the spring element may have a net structure or a net-like structure. A net structure or net-like structure generally comprises a wall with apertures or holes, which may be arranged in any geometrical or non-geometrical pattern. A net or net-like structure provides a guided deformation of the spring along the longitudinal axis. A net structure or net-like structure can be for example be in form of a woven material. The term 'woven' is not intended to be limiting to any weaving pattern or threading or knotting. Rather, 'woven' is understood as any arrangement of material, which forms a wall with apertures or holes. The net structure or net-like structure can in addition or alternatively be in form of a cell grid, wherein the shape and the arrangement of the cells to form the grid can be chosen in a way to simultaneously provide a certain elasticity and mechanical properties to the material, such that it can be deformed.

Figure 3:
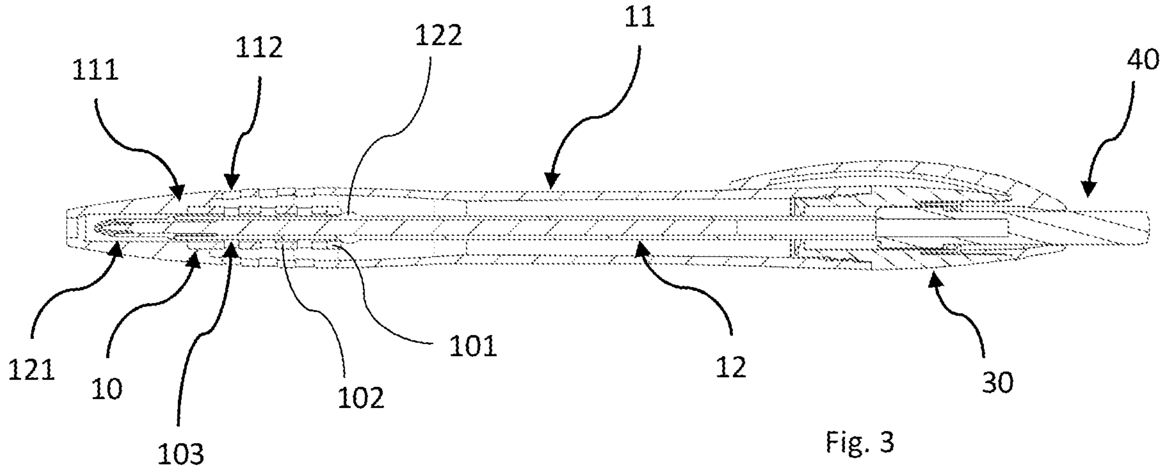
FIG. 3 is a section view of a writing instrument.

The second portion 102 of the tubular elastic spring element 10 as shown comprises a wall which thickness is constant over the length of the second portion 102. In FIG. 3, the wall thickness of the second portion 102 is constant over the entire length of the second portion 102. In embodiments not shown, the wall thickness of the second portion 102 may be constant over only part of the length of the second portion 102. In examples, the wall of the second portion 102 may vary over the entire or part of the length of the second portion 102.

Figure 4:
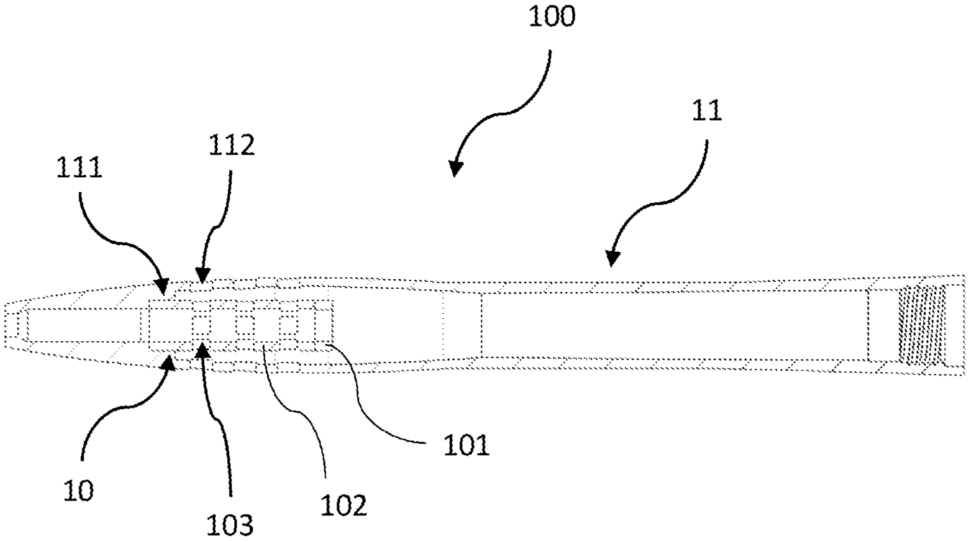
FIG. 4 is a partial section view of a writing instrument.

Referring to FIGS. 3, and 4 the wall of the second portion 102 comprises a plurality of apertures 103, which are distributed over the surface of the second portion 102. The plurality of apertures 103 is arranged as a net or net-like structure, such as to form for example a cell grid of for example a woven material or others, wherein the shape and the arrangement of the cells to form the grid is chosen in a way to simultaneously provide a certain elasticity and mechanical properties to the material, such that it can be deformed. Each aperture 103 extends through the thickness of the wall of the second portion 102 in a manner that a central axis of each but at least one of the apertures 103 extends perpendicularly to the longitudinal axis of the spring element 10. In the illustrated embodiments, all apertures 103 of each embodiment present the same shape. In embodiments not shown, the central axis of at least one of the apertures may extend radially with an angle from the longitudinal axis of the spring element. Further, at least some of the apertures may have the same shape. When the apertures have the same shape, the deformation of the spring may be uniform along the longitudinal axis. In examples, at least some or substantially all apertures may have different shapes. The shapes can be any of a geometrical form among round, square, triangle, rectangular, hexagonal and others. The shapes can also be any of free designs. The selection of the shapes may permit to determine the mechanical properties sought for the spring element, and particularly permit to determine the deformation characteristics (e.g. ease and directions) of the second portion.

Generally, the spring element is configured to change from a relaxed state to a contracted state when it is subjected to a compression force in the longitudinal direction. Further, the spring element is configured to revert from the contracted state to the relaxed state when the compression force in the longitudinal direction is released. In the contracted state, the second portion of the spring element is deformed such that the total length of the spring element is reduced compared to the length of the second portion in the relaxed state. This deformability characteristic provides the spring effect of the spring element, such that the spring element of the present disclosure behaves like a metallic spring as known in the field.

The materials of the first portion 101 and the second portion 102 may be selected such as to allow the spring element 10 to deform elastically (contract and relax) as described above. The first portion 101 may comprise a polymer, in particular a hard plastic or a photopolymer resin. On the opposite, the second portion 102 may comprise an elastomer, in particular a natural or a synthetic elastomer. The second portion 102 may further comprise a rubber-like photopolymer resin. The hardness of the second less rigid material may be measured in shore A hardness. The material of the second portion 102 of the spring element 10 may have a shore A hardness between 0 and 90, more specifically between 20 and 85, in particular between 40 and 80. In some embodiments, a rubber spring element can be considered, presenting elastic deformation properties such that it can be deformed when subjected to external forces, and recovers its initial shape when released. The set of apertures arrangement (number, dimensions, shape etc.) of the second portion 102 along with the shore A hardness of the second material contributes to determine the force needed for the compression of the spring element.

Referring to e.g. FIG. 3 illustrating a retractable writing instrument, the spring element 10 is located around a portion of the elongated writing medium cartridge 12 and within the elongated casing 11 of the writing instrument 1. The spring elements according to the present disclosure, including for example an elastic netting or netting-like structure made of soft plastic, such as rubber, and/or presenting several apertures on its softer second portion works like a metallic spring as known in the field. The spring element may present elastic deformation properties such that it can be deformed when subjected to external forces and recovers its initial shape when released. With this, it can, when assembled in a retractable writing instrument as described above, work as a spring for the retraction and extension of the writing medium cartridge (e.g. ink cartridge). The elastic characteristic of the spring element according to the present disclosure substitutes the original metal spring necessity. The use of a tubular elastic spring element as disclosed provides for an enhanced control of the force needed for the extension and the retraction of the writing medium cartridge, as wells as the speed with which the writing medium cartridge will extend and retract within the casing of the writing instrument.

One method of manufacturing the tubular elastic spring element 10 may comprise an additive manufacturing process. Ideally, the spring element 10 may be manufactured by known 3D-printing process. The tubular elastic spring element 10 for a writing instrument 1 comprising a first portion 101 out of a first material and a second portion 102 out of a second material may be manufactured in a layer-by-layer depositing process. The printing direction of the spring element 10 may be the direction of its longitudinal axis. Successive layers of the first material may be deposited to form the first portion 101, followed by the deposition of successive layers of the second material to form the second portion 102. The additive manufacturing process may make use of support structures to support the hollow areas of the second portion 102 which will form the apertures 103 of the finished second portion 102. In examples, the second portion 102 may be printed prior to the first portion 101. In embodiments, the printing direction of the spring element 10 may be the direction perpendicular to the longitudinal axis of the finished spring element 10. Herein, the first and second materials may be deposited simultaneously. Support structures may be used to support the hollow areas of the second portion 102, the hollow center of the tubular element and/or serve as external base support to avoid the element moving (e.g. turning) during printing. After manufacturing, the support structures may be removed by any chemical, physical or other process (e.g. by high pressure waterjet technology or in a sodium hydroxide solution or any combination of these and/or other methods).

The spring element may, in examples, be manufactured by molding, casting or any other process. In examples, the first and the second portions may be manufactured separately and joined together by e.g. gluing.

Without limiting the present disclosure to any specific embodiment, the described characteristics of the tubular elastic spring elements apply for any other embodiment of a writing instrument, and/or any assembly and/or sub-assembly in which it may be used.

Any structural and functional characteristic of the single tubular elastic spring element as described above are general features of it and are supposed to apply for any single tubular elastic spring element described in the present disclosure. Combinations with other components of a writing instrument shall not affect the general features of the tubular elastic spring element. On the contrary, features may be added when the tubular elastic spring element is combined with other components. These will be described accordingly below.

Figure 2:
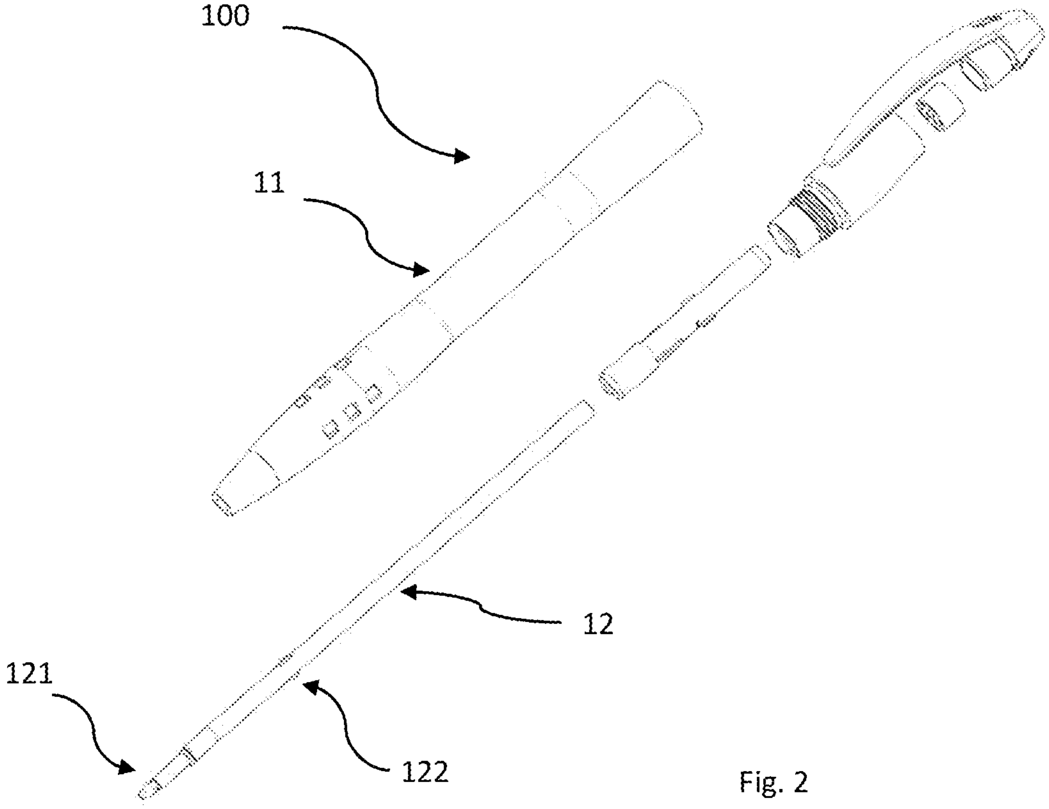
FIG. 2 is an exploded view of a writing instrument.

FIGS. 1 and 2 illustrate further characteristics of a writing instrument according to the present disclosure. The spring element 10 is arranged around a portion of the writing medium cartridge 12 and simultaneously arranged within the casing 11. The spring element 10 is located in the distal area (front area) of the casing 11. In embodiments, the spring element may be located in another area of the casing. As depicted in FIGS. 3 and 4, the casing 11 comprises a shoulder 111 on its inner surface. The spring element 10 faces the inner shoulder 111 in the casing 11. The spring element 10 is further positioned for abutment with the inner shoulder 111 in the casing 11. The casing 11 comprises a wall comprising a plurality of apertures 112 and the plurality of apertures 112 of the casing 11 face the plurality of apertures 103 of the spring element 10. The arrangement and shapes of the plurality of apertures 112 of the casing 11 correspond in projection to the arrangement and shapes of the plurality of apertures 103 of the spring element 10. Additionally, the dimensions of each aperture 112 of the casing 11 are a projection of the dimensions of the corresponding facing apertures 103 of the spring element 10. In embodiments, the dimensions of each aperture of the casing may correspond to the dimensions of the corresponding facing aperture of the spring element. The apertures of the casing may be aligned with the apertures of the spring element to ease the removal of support structures used during manufacturing. This is described more in detail below.

The casing 11 may be manufactured by an additive manufacturing process. In particular, the casing 11 may be manufactured by known 3D-printing process, wherein the material of the casing 11 may be deposited layer-by-layer to form the final part. Ideally, the casing 11 is printed from its distal end to its proximal end, wherein the longitudinal direction of the casing 11 may correspond to the vertical direction of the 3D printing process.

In some embodiment, the spring element 10 and the casing 11 may form an integral part. In FIG. 4, a distal end of the end portion of the spring element 10 may be integral with a proximal end of the shoulder 111 of the casing 11. Additionally, to allow deformations of the spring element 10 in the radial direction, a gap may be present between the outer perimeter of the spring element 10 and the inner perimeter of the casing 11. The integral part formed by the casing 11 and the spring element 10 may form the casing assembly 100. The provision of spring element 10 being integral eliminates, or at least reduces the risk of the spring being lost while the user replaces the writing medium cartridge.

The casing 11 and the spring element 10 as described above may be integrally formed. One method of simultaneously manufacturing the elongated tubular casing 11 and the tubular elastic spring element 10 may comprise an additive manufacturing process. Ideally, the casing 11 and the spring element 10 may be manufactured by known 3D-printing process, wherein the material of the casing 11, and the first and second materials of the spring element 10 may be deposited layer-by-layer to finally form the integral part. The integral part formed by the casing 11 and the spring element 10 may be printed in one print (alternatively in more than one print) from its distal end (left side of the part on FIG. 4) to its proximal end (right side of the part on FIG. 4), wherein the longitudinal direction of the casing 11 and spring element 10 may correspond to the vertical direction of the 3D printing process. In examples, the integral part formed by the casing 11 and the spring element 10 may be printed from its proximal end to its distal end. Support structures may be used to fill hollow areas during manufacturing. In examples, the casing 11 and spring element 10 may be integrally manufactured by molding, casting, joined together by gluing or any other manufacturing process. The casing 11 may comprise a polymer, in particular a hard plastic or a photopolymer resin. In some embodiments, the first portion 101 of the spring element 10 may be made of the same material as the casing 11 to enhance functionality. In some embodiments, the materials of the first portion 101 of the spring element 10 and of the casing 11 may be different.

Additionally, support structures may be created and/or used during the 3D-printing process to simultaneously support the aligned hollow areas of the second portion 102 and the casing 11 formed by the apertures 103 and 112, or the hollow center area within the casing 11 and/or spring element 10, and/or serve as external base support to avoid the element moving (e.g. turning) during printing. After manufacturing, the support structures may be removed by any chemical, physical or other process (e.g. by high pressure waterjet technology or in a sodium hydroxide solution or any combination of these and/or other methods).

Referring to FIGS. 2 and 3, the writing medium cartridge 12 further comprises a writing tip 121 at a distal end. The casing 11 surrounds the writing medium cartridge 12 and the spring element 10, such that the writing medium cartridge 12 is slidable within the casing 11 and the spring element 10 in the longitudinal direction. Additionally, the writing medium cartridge 12 comprises a shoulder 122 on its outer surface configured to abut the end surface of the first portion 101 of the spring element 10.

In a first position as shown in FIG. 3, the spring element 10 is in the relaxed state as described above and in a second position not represented in the figures, the spring element 10 may be in the contracted state as also described above. In the contracted state, the spring element 10 may be compressed between the shoulder 111 of the casing 11 and the shoulder 122 of the writing medium cartridge 12. This characteristic of the spring element 10 allows it to fulfill the function of a spring, such as a metallic spring in a retractable writing instrument as known in the field. The elastic characteristic of the spring element 10 according to the present disclosure substitutes the original metal spring necessity.

A second embodiment of a writing instrument according to the present disclosure is illustrated in FIGS. 5 to 8 and may be, where possible, combined with characteristics of the first embodiment as described above. In this second embodiment, the writing instrument 2 also at least comprises an elongated tubular casing 21, an elongated writing medium cartridge 22 and a tubular elastic spring element 20.

Figure 7:
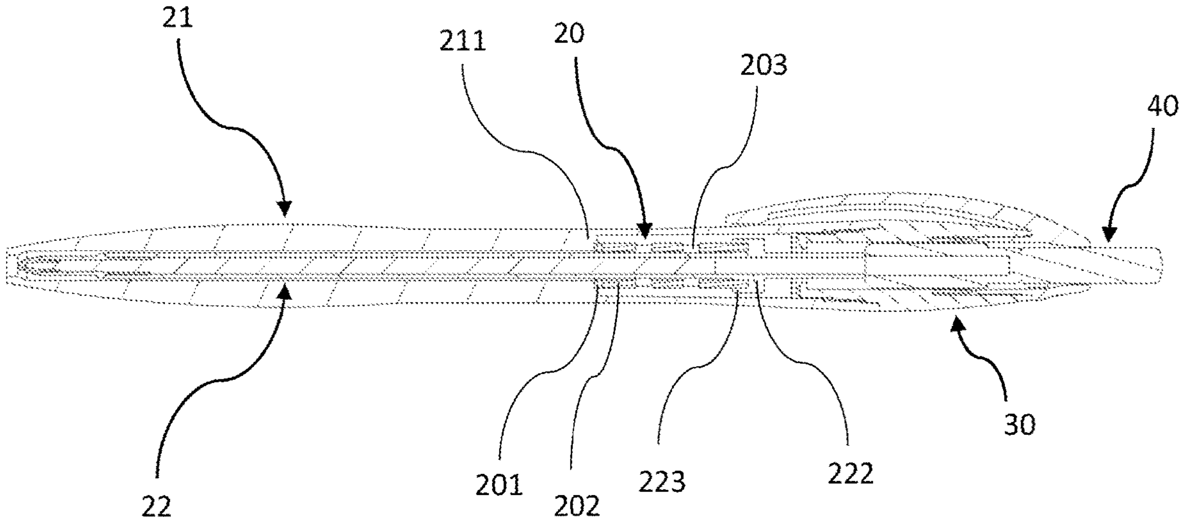
FIG. 7 is a section view of another writing instrument.
Figure 8:
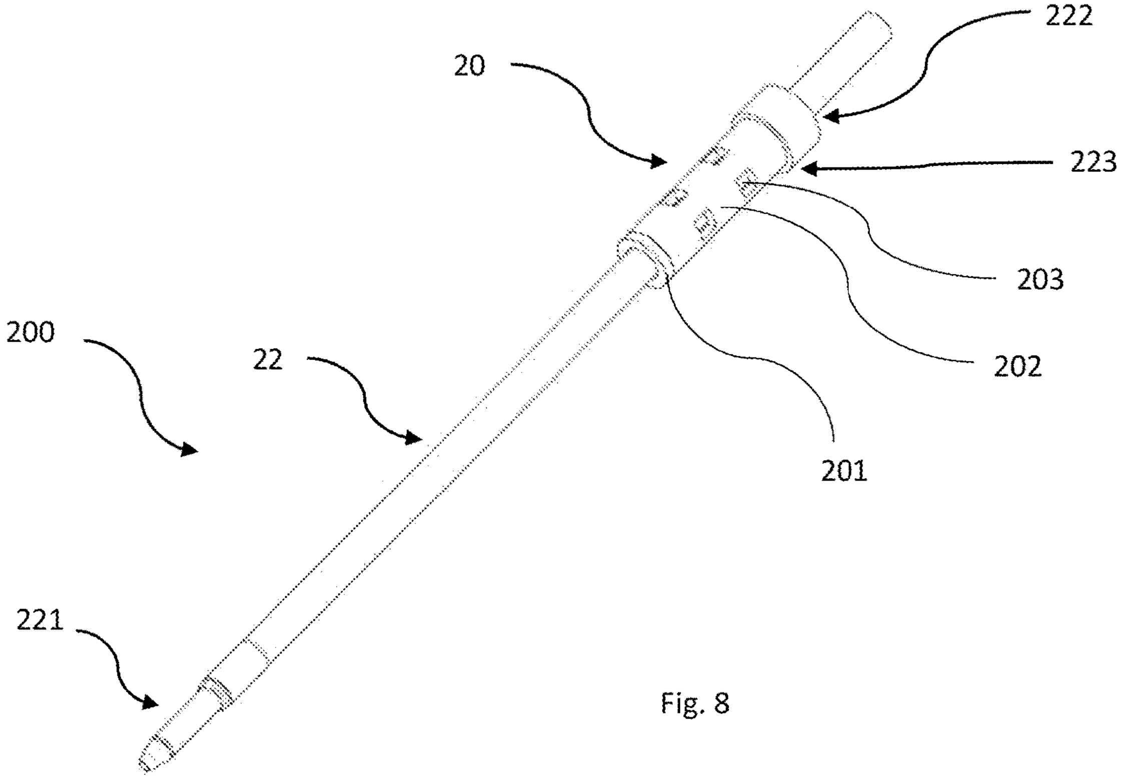
FIG. 8 is a partial schematic view of another writing instrument or cartridge assembly.

The tubular elastic spring element 20 comprises a first portion 201 and a second portion 202. The first portion 201 comprises a first material and the second portion 202 comprises a second material, wherein the first material is more rigid than the second material. As represented, first portion 201 and the second portion 202 are arranged longitudinally to each other. Additionally, the first portion 201 and the second portion 202 form an integral part, and the spring element 20 has a closed shape, such as to have one single tubular element. Referring to FIGS. 7, and 8 the wall of the second portion 202 comprises a plurality of apertures 203, which are distributed over the surface of the second portion 202. Each aperture 203 extends through the thickness of the wall of the second portion 202 in a manner that a central axis of each but at least one of the apertures 203 extends perpendicularly to the longitudinal axis of the spring element 20. In the illustrated embodiments, all apertures 203 of each embodiment present the same shape. Any further structural and functional characteristic of the single tubular elastic spring element as described above apply to the spring element of this embodiment.

Figure 5:
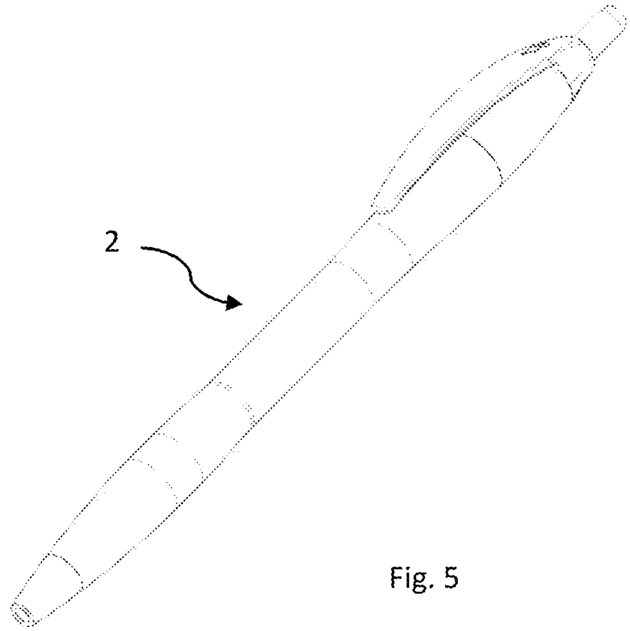
FIG. 5 is a schematic view of another writing instrument.
Figure 6:
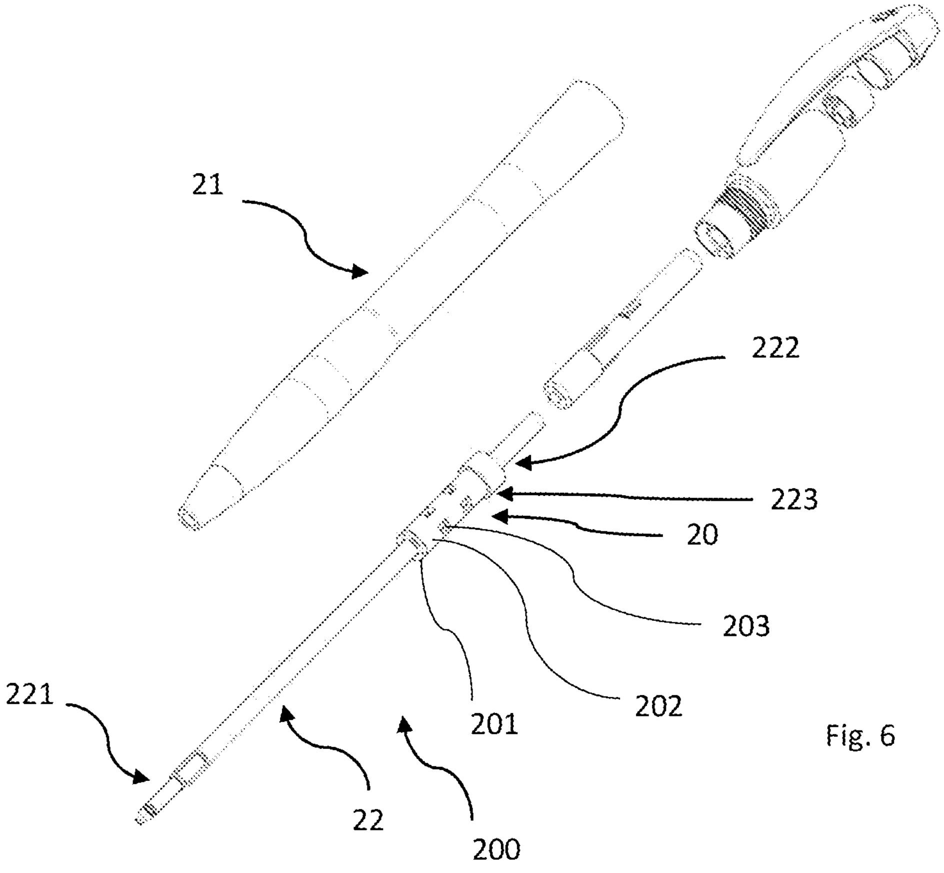
FIG. 6 is an exploded view of another writing instrument.

As depicted in FIGS. 5 and 6, the spring element 20 is arranged around a portion of the writing medium cartridge 22 and simultaneously arranged within the casing 21. The spring element 20 is located in the proximal area (rear area) of the writing medium cartridge 22. In embodiments, the spring element 20 may be located in another area of the casing 21. The writing medium cartridge 22 comprises a shoulder 222 on its outer surface. The second portion of the spring element 20 faces the shoulder 222 on the writing medium cartridge 22. Herein, the shoulder 222 of the writing medium cartridge 22 comprises a groove 223 directed in the longitudinal direction towards the distal end of the writing medium cartridge 22. An end portion of the second portion of the spring element 20 is arranged in the groove 223.

The writing medium cartridge 22 may be manufactured by an additive manufacturing process. In particular, the writing medium cartridge 22 may be manufactured by known 3D-printing process, wherein the material of the writing medium cartridge 22 may be deposited layer-by-layer to form the final part. Alternatively or in addition, the writing medium cartridge 22 may be manufactured by molding, casting or any other manufacturing process.

In some embodiments, the spring element 20 as described above, and the writing medium cartridge 22 may form an integral part. In FIG. 8, an end portion of the second portion 202 of the spring element 20 is integrated in the groove 223 of the writing medium cartridge 22. Additionally, to allow deformations of the spring element 20 in the radial direction, for example during compression, a gap is present between the inner perimeter of the spring element 20 and the outer perimeter of the writing medium cartridge 22 (also shown in FIG. 7). In embodiments not shown in the figures, a proximal end of the second portion 202 of the spring element 20 may be integral with a distal end of the shoulder 222 on the writing medium cartridge 22, and a gap may be present between the inner perimeter of the spring element 20 and the outer perimeter of the writing medium cartridge 22.

One method of simultaneously manufacturing the tubular elastic spring element 20 and the elongated writing medium cartridge 22 may comprise an additive manufacturing process.

Ideally, the spring element 20 and the writing medium cartridge 22 may be manufactured by known 3D-printing process, wherein the material of the writing medium cartridge 22, and the first and second materials of the spring element 20 may be deposited layer-by-layer to finally form the integral part. The integral part formed by the spring element 20 and the writing medium cartridge 22 may be printed in one print (alternatively in more than one print) from its proximal end (right side of the part on FIG. 8) to its distal end (left side of the part on FIG. 8), wherein the longitudinal direction of the spring element 20 and the writing medium cartridge 22 may correspond to the vertical direction of the 3D printing process. Alternatively or in addition, the integral part formed by the spring element 20 and the writing medium cartridge 22 may be printed from its distal end to its proximal end. Support structures may be used to fill hollow areas during manufacturing. Alternatively or in addition, the spring element 20 and the writing medium cartridge 22 may be integrally manufactured by molding, casting, joined together by gluing or any other manufacturing process. The writing medium cartridge 22 may comprise a polymer, in particular a hard plastic. In some embodiments, the first portion 201 of the spring element 20 may be made of the same material as the writing medium cartridge 22. In some embodiments, the materials of the first portion 201 of the spring element 20 and the writing medium cartridge 22 may be different.

Referring to FIGS. 6 and 7, the elongated tubular casing 21 surrounds the writing medium cartridge 22 and the spring element 20, such that the writing medium cartridge 22 and the spring element 20 are slidable within the casing 21 in the longitudinal direction. Additionally, the casing 21 comprises a shoulder 211 on its inner surface such that the end surface of the first portion 201 of the spring element 20 faces the shoulder 211 on the casing 21.

In a first position as shown in FIG. 7, the spring element 20 may be in the relaxed state as described above and in a second position not shown in the figures, the spring element 20 may be in the contracted state as also described above. In the second position, the spring element 20 is compressed between the shoulder 211 of the casing 21 and the shoulder 222 of the writing medium cartridge 22. As already described above, this characteristic of the spring element 20 allows it to fulfill the function of a spring, such as a metallic spring in a retractable writing instrument as known in the field. The elastic characteristic of the spring element 20 according to the present disclosure substitutes the original metal spring necessity.

In certain embodiments, the elongated writing medium cartridge and the tubular elastic spring element can be considered as a separate cartridge assembly. Taking FIG. 8 alone, the illustrated cartridge assembly 200 shows one embodiment of such an assembly. The cartridge assembly 200 comprises an elongated writing medium cartridge 22 and a tubular elastic spring element 20. The elongated writing medium cartridge 22 comprises a writing tip 221 at a distal end. The tubular elastic spring element 20 comprises a first portion 201 and a second portion 202. The first portion 201 comprises a first material and the second portion 202 comprises a second material, wherein the first material is more rigid than the second material. As represented, first portion 201 and the second portion 202 are arranged longitudinally to each other. The structural and functional characteristics of the spring element 20 and the elongated writing medium cartridge 22 as described above also apply for the specific embodiment of the cartridge assembly 200. With a cartridge assembly as described herein provides for a type of assembly that can be configured to fit with several different casings. With that, the cartridge assembly is not limited to one specific casing.

The cartridge assembly may be assembled with a casing to form a writing instrument. One embodiment of such an assembly may also be illustrated with FIG. 7 (and in FIG. 6 as exploded view of it). The writing instrument 2 at least comprises the cartridge assembly 200 as described above and an elongated tubular casing 21 surrounding the cartridge assembly 200, such that the cartridge assembly 200 is slidable within the casing 21 in the longitudinal direction. The casing 21 comprises a shoulder 211 on its inner surface such that the end surface of the first portion 201 of the spring element 20 faces the shoulder 211 on the casing 21.

In use, in a first position as shown in FIG. 7, the spring element 20 is in the relaxed state and in a second position, the spring element is in the contracted state. Relaxed and contracted states correspond to the states as already described above. In the second position, the spring element 20 is compressed between the shoulder 211 of the casing 21 and the shoulder 222 of the writing medium cartridge 22.

One method of manufacturing the cartridge assembly 200 may comprise an additive manufacturing process. As already described above, wherein the writing medium cartridge 22 and the spring element 20 form an integral part, the assembly is ideally manufactured by 3D-printing. Alternatively or in addition, the spring element 20 and the writing medium cartridge 22 may be integrally manufactured by molding, casing, joined together by gluing or any other manufacturing process.

In aspects, as for example shown in FIGS. 1 to 3 (and analogically in FIGS. 5 to 7), the writing instrument comprises an elongated tubular casing 11, a writing medium cartridge 12, an actuating mechanism 30 and a tubular elastic spring element 10. The writing medium cartridge 12 is arranged within the casing and has a writing tip 121 at a distal end. The actuating mechanism 30 is configured to translate the writing medium cartridge 12 between a first position, in which the writing tip 121 is situated within the casing 11, and a second position. The tubular elastic spring element 10 is configured to bias the writing medium cartridge 12 in the second position. The tubular elastic spring element 10 comprises a first portion 101 and a second portion 102. The first portion 101 may comprise a first material, and the second portion 102 may comprise a second material, wherein the first material may be more rigid than the second material. As illustrated, the spring element 10 is arranged within the casing 11 and around a portion of the writing medium cartridge 12. The more rigid first material may provide a secure positioning and/or attachment of the spring element towards the writing medium cartridge. In fact, it may eliminate the risk of the cartridge protrusion being inserted into the tubular spring element in case of the first material is too soft and easily deformable, which may inhibit the function of the actuation mechanism.

The writing instrument as illustrated in FIGS. 1 to 3 (and analogically in FIGS. 5 to 7) further comprises an actuation element 40 configured to actuate the actuation mechanism 30 to permit a slidable extension and retraction of the writing medium cartridge 12 within the casing 11. To do so, the actuation element 40 is connected to the actuating mechanism 30. Generally, the actuating mechanism 30 is arranged within the casing 11. Moreover, the actuating mechanism 30 is arranged at a proximal end of the writing medium cartridge 12.

In any of the foregoing embodiments, the first portion of the spring element may comprise a polymer, in particular a hard plastic or a photopolymer resin and the second portion may comprise an elastomer, in particular a natural or a synthetic elastomer. The second portion may further comprise a rubber-like photopolymer resin. In any embodiment, the first portion of the spring element shall be more rigid than the second portion of the spring element. The casing may comprise a polymer, in particular a hard plastic or a photopolymer resin. The first portion of the spring element and the casing may comprise the same material, for example the same hard plastic. The writing medium cartridge may comprise a polymer, in particular a hard plastic. The writing medium cartridge may comprise the same materials as the spring element. Further, the first portion of the spring element and the writing medium cartridge may comprise the same material. Some of the materials may be common between the components. The materials used in this disclosure shall at least be compatible with additive manufacturing process such as 3D-printing. Overall, the materials used for any of the components shall be compatible with the manufacturing process used. All these characteristics may apply without limitation to any of the embodiments disclosed herein.

Although the present invention has been described above and is defined in the attached claims, it should be understood that the invention may alternatively be defined in accordance with the following embodiments:

1. A writing instrument comprising
   an elongated tubular casing (11, 21);
   an elongated writing medium cartridge (12, 22); and
   a tubular elastic spring element (10, 20);
   wherein the tubular elastic spring element comprises:
      a first portion (101, 201); and
      a second portion (102, 202);
      wherein the second portion (102, 202) comprises a wall comprising a plurality of apertures (103, 203).
2. The writing instrument according to embodiment 1, wherein the plurality of apertures is arranged as a net-like structure.
3. The writing instrument according to any of the preceding embodiments, wherein the first portion comprises a first material and the second portion comprises a second material, and wherein the first material is more rigid than the second material.
4. The writing instrument according to any of the preceding embodiments, wherein the first portion and the second portion form an integral part.
5. The writing instrument according to any of the preceding embodiments, wherein the first portion and the second portion are arranged longitudinally to each other.
6. The writing instrument according to any of the preceding embodiments, wherein the spring element has a closed shape.
7. The writing instrument according to any of embodiments 1 to 5, wherein the spring element has an open shape.
8. The writing instrument according to any of the preceding embodiments, wherein a thickness of the wall of the second portion is constant over a length of the second portion.
9. The writing instrument according to any of embodiments 1 to 7, wherein a thickness of the wall of the second portion varies over a length of the second portion.
10. The writing instrument according to any of the preceding embodiments, wherein a central axis of at least one of the apertures extends perpendicularly to the longitudinal axis of the spring element.
11. The writing instrument according to any of embodiments 1 to 9, wherein a central axis of at least one of the apertures extend radially with an angle from the longitudinal axis of the spring element.
12. The writing instrument according to any of the preceding embodiments, wherein at least some of the apertures have the same shape, in particular wherein substantially all apertures have the same shape.
13. The writing instrument according to any of embodiments 1 to 11, wherein at least some of the apertures have different shapes, in particular wherein substantially all apertures have a different shape.
14. The writing instrument according to any of the preceding embodiments, wherein the spring element is configured to change from a relaxed state to a contracted state when it is subjected to a compression force in the longitudinal direction.
15. The writing instrument according to embodiment 14, wherein the spring element is configured to revert from the contracted state to the relaxed state when the compression force in the longitudinal direction is released.
16. The writing instrument according to any of embodiments 14 to 15, wherein in the contracted state, the second portion of the spring element is deformed such that the total length of the spring element is reduced compared to the length of the second portion in the relaxed state.
17. The writing instrument according to any of the preceding embodiments, wherein the first portion comprises a polymer, in particular a hard plastic or a photopolymer resin.
18. The writing instrument according to any of the preceding embodiments, wherein the second portion comprises an elastomer, in particular a natural or a synthetic elastomer.
19. The writing instrument according to any of the preceding embodiments, wherein the material of the second portion of the spring element has a shore A hardness between 0 and 90.
20. The writing instrument according to any of the preceding embodiments, wherein the material of the second portion of the spring element has a shore A hardness between 20 and 85.
21. The writing instrument according to any of the preceding embodiments, wherein the material of the second portion of the spring element has a shore A hardness between 40 and 80.
22. The writing instrument according to any of the preceding embodiments, wherein the spring element is manufactured by an additive manufacturing process.
23. The writing instrument according to any of the preceding embodiments, wherein the spring element is arranged around a portion of the writing medium cartridge.
24. The writing instrument according to any of the preceding embodiments, wherein the spring element is arranged within the casing.
25. The writing instrument according to any of the preceding embodiments, wherein the casing comprises a shoulder (111) on its inner surface.
26. The writing instrument according to embodiment 25, wherein the second portion of the spring element faces the inner shoulder in the casing.
27. The writing instrument according to any of the preceding embodiments, wherein the casing (11) comprises a wall comprising a plurality of apertures (112) and wherein the plurality of apertures (112) of the casing (11) face the plurality of apertures (103) of the spring element (10).
28. The writing instrument according to embodiment 27, wherein the arrangement and shapes of the plurality of apertures of the casing corresponds in projection to the arrangement and shapes of the plurality of apertures of the spring element.
29. The writing instrument according to any of embodiments 27 to 28, wherein the dimensions of each aperture of the casing correspond to the dimensions of the corresponding facing aperture of the spring element.
30. The writing instrument according to any of embodiments 27 to 28, wherein the dimensions of each aperture of the casing are a projection of the dimensions of the corresponding facing aperture of the spring element.

31. The writing instrument according to any of the preceding embodiments, wherein the casing is manufactured by an additive manufacturing process.
32. The writing instrument according to any of the preceding embodiments, wherein the spring element and the casing form an integral part.
33. The writing instrument according to embodiment 32, wherein a distal end of the end portion of the spring element is integral with a proximal end of the shoulder of the casing, and wherein a gap is present between the outer perimeter of the spring element and the inner perimeter of the casing.
34. The writing instrument according to any of embodiments 32 to 33, wherein the casing and the spring element are integrally formed, in particular by an additive manufacturing process.
35. The writing instrument according to any of the preceding embodiments, wherein the casing comprises a polymer, in particular a hard plastic or a photopolymer resin.
36. The writing instrument according to any of the preceding embodiments, wherein the writing medium cartridge (12) comprises a writing tip (121) at a distal end; and wherein the casing (11) surrounds the writing medium cartridge and the spring element (10), such that the writing medium cartridge (12) is slidable within the casing (11) and the spring element (10) in the longitudinal direction;
    wherein the writing medium cartridge (12) comprises a shoulder (122) on its outer surface configured to abut the end surface of the first portion (101) of the spring element (10).
37. The writing instrument according to embodiment 36, wherein, in a first position, the spring element is in the relaxed state and, in a second position, the spring element is in the contracted state.
38. The writing instrument according to embodiment 37, wherein in the second position, the spring element is compressed between the shoulder of the casing and the shoulder of the writing medium cartridge.
39. The writing instrument according to any of embodiments 1 to 24, wherein the writing medium cartridge (22) comprises a shoulder (222) on its outer surface.
40. The writing instrument according to embodiment 39, wherein the second portion of the spring element faces the shoulder on the writing medium cartridge.
41. The writing instrument according to any of embodiments 39 to 40, wherein the shoulder (222) of the writing medium cartridge (22) comprises a groove (223) directed in the longitudinal direction towards the distal end of the writing medium cartridge (22).
42. The writing instrument according to embodiment 41, wherein an end portion of the second portion of the spring element is arranged in the groove.
43. The writing instrument according to any of embodiments 39 to 42, wherein the writing medium cartridge is manufactured by an additive manufacturing process.
44. The writing instrument according to any of embodiments 39 to 43, wherein the spring element and the writing medium cartridge form an integral part.
45. The writing instrument according to embodiment 44, wherein a proximal end of the second portion of the spring element is integral with a distal end of the shoulder on the writing medium cartridge, and wherein a gap is present between the inner perimeter of the spring element and the outer perimeter of the writing medium cartridge.
46. The writing instrument according to embodiment 44, wherein an end portion of the second portion of the spring element is integrated in the groove of the writing medium cartridge, and wherein a gap is present between the inner perimeter of the spring element and the outer perimeter of the writing medium cartridge.
47. The writing instrument according to any of embodiments 44 to 46, wherein the integral part formed by the spring element and the writing medium cartridge is manufactured by an additive manufacturing process.
48. The writing instrument according to any of embodiments 39 to 47, wherein the writing medium cartridge comprises a polymer, in particular a hard plastic.
49. The writing instrument according to any of embodiments 1 to 24 or 39 to 48, wherein the elongated tubular casing (21) surrounds the writing medium cartridge (22) and the spring element (20), such that the writing medium cartridge (22) and the spring element (20) are slidable within the casing (21) in the longitudinal direction;
    wherein the casing (21) comprises a shoulder (211) on its inner surface such that the end surface of the first portion (201) of the spring element (20) faces the shoulder (211) on the casing (21).
50. The writing instrument according to embodiment 49, wherein, in a first position, the spring element is in the relaxed state and, in a second position, the spring element is in the contracted state.
51. The writing instrument according to embodiment 50, wherein in the second position, the spring element is compressed between the shoulder of the casing and the shoulder of the writing medium cartridge.
52. A cartridge assembly (200) for a writing instrument comprising:
    an elongated writing medium cartridge (22) comprising a writing tip (221) at a distal end; and
    a tubular elastic spring element (20);
    wherein the tubular elastic spring element (20) comprises:
        a first portion (101, 201); and
        a second portion (102, 202);
        wherein the second portion (102, 202) comprises a wall comprising a plurality of apertures (103, 203).
53. The cartridge assembly according to embodiment 52, wherein the first portion comprises a first material and the second portion comprises a second material, and wherein the first material is more rigid than the second material.
54. The cartridge assembly according to any of embodiment 52 to 53, wherein the first portion and the second portion form an integral part.
55. The writing instrument according to embodiments 52 to 54, wherein the first portion and the second portion are arranged longitudinally to each other.
56. The cartridge assembly according to any of embodiments 52 to 55, wherein the spring element has a closed shape.
57. The cartridge assembly according to any of embodiments 52 to 55, wherein the spring element has an open shape.
58. The cartridge assembly according to any of embodiments 52 to 55, wherein the second portion comprises a net-like structure.

59. The cartridge assembly according to any of embodiments 52 to 58, wherein a thickness of the wall of the second portion is constant over a length of the second portion.
60. The cartridge assembly according to any of embodiments 52 to 58, wherein a thickness of the wall of the second portion varies over a length of the second portion.
61. The cartridge assembly according to any of embodiments 52 to 60, wherein a central axis of at least one of the apertures extends perpendicularly to the longitudinal axis of the spring element.
62. The cartridge assembly according to any of embodiments 52 to 60, wherein a central axis of at least one of the apertures extend radially with an angle from the longitudinal axis of the spring element.
63. The cartridge assembly according to any of embodiments 52 to 62, wherein at least some of the apertures have the same shape, in particular wherein substantially all apertures have the same shape.
64. The cartridge assembly according to any of embodiments 52 to 62, wherein at least some of the apertures have different shapes, in particular wherein substantially all apertures have a different shape.
65. The cartridge assembly according to any of embodiments 52 to 64, wherein the spring element is configured to change from a relaxed state to a contracted state when it is subjected to a compression force in the longitudinal direction.
66. The cartridge assembly according to embodiment 65, wherein the spring element is configured to revert from the contracted state to the relaxed state when the compression force in the longitudinal direction is released.
67. The cartridge assembly according to any of embodiments 65 to 66, wherein in the contracted state, the second portion of the spring element is deformed such that the total length of the spring element is reduced compared to the length of the second portion in the relaxed state.
68. The cartridge assembly according to any of embodiments 52 to 67, wherein the first portion comprises a polymer, in particular a hard plastic or a photopolymer resin.
69. The cartridge assembly according to any of embodiments 52 to 68, wherein the second portion comprises an elastomer, in particular a natural or a synthetic elastomer.
70. The cartridge assembly according to any of embodiments 52 to 69, wherein the material of the second portion of the spring element has a shore A hardness between 0 and 90.
71. The cartridge assembly according to any of embodiments 52 to 70, wherein the material of the second portion of the spring element has a shore A hardness between 20 and 85.
72. The cartridge assembly according to any of embodiments 52 to 71, wherein the material of the second portion of the spring element has a shore A hardness between 40 and 80.
73. The cartridge assembly according to any of embodiments 52 to 72, wherein the spring element is manufactured by an additive manufacturing process.
74. The cartridge assembly according to any of embodiments 52 to 73, wherein the spring element is arranged around a portion of the writing medium cartridge.

75. The cartridge assembly according to any of embodiments 52 to 74, wherein the writing medium cartridge (22) comprises a shoulder (222) on its outer surface.
76. The cartridge assembly according to embodiment 75, wherein the second portion of the spring element faces the shoulder on the writing medium cartridge.
77. The cartridge assembly according to any of embodiments 75 to 76, wherein the shoulder (222) of the writing medium cartridge (22) comprises a groove (223) directed in the longitudinal direction towards the distal end of the writing medium cartridge (22).
78. The cartridge assembly according to embodiment 77, wherein an end portion of the second portion of the spring element is arranged in the groove.
79. The cartridge assembly according to any of embodiments 52 to 78, wherein the writing medium cartridge is manufactured by an additive manufacturing process.
80. The cartridge assembly according to any of embodiments 52 to 79, wherein the spring element and the writing medium cartridge form an integral part.
81. The cartridge assembly according to embodiment 80, wherein a proximal end of the second portion of the spring element is integral with a distal end of the shoulder on the writing medium cartridge, and wherein a gap is present between the inner perimeter of the spring element and the outer perimeter of the writing medium cartridge.
82. The cartridge assembly according to embodiment 80, wherein an end portion of the second portion of the spring element is integrated in the groove of the writing medium cartridge, and wherein a gap is present between the inner perimeter of the spring element and the outer perimeter of the writing medium cartridge.
83. The cartridge assembly according to any of embodiments 80 to 82, wherein the integral part formed by the spring element and the writing medium cartridge is manufactured by an additive manufacturing process.
84. The cartridge assembly according to any of embodiments 52 to 83, wherein the writing medium cartridge comprises a polymer, in particular a hard plastic.
85. A writing instrument (2) comprising:
   - the cartridge assembly (200) according to any of embodiments 52 to 84;
   - an elongated tubular casing (21) surrounding the cartridge assembly (200), such that the cartridge assembly (200) is slidable within the casing (21) in the longitudinal direction;
   - wherein the casing (21) comprises a shoulder (211) on its inner surface such that the end surface of the first portion (201) of the spring element (20) faces the shoulder (211) on the casing (21).
86. The writing instrument according to embodiment 85, wherein, in a first position, the spring element is in a relaxed state and, in a second position, the spring element is in a contracted state.
87. The writing instrument according to embodiment 86, wherein in the second position, the spring element is compressed between the shoulder of the casing and the shoulder of the writing medium cartridge.
88. A writing instrument (1, 2) comprising:
   - an elongated tubular casing (11, 21);
   - a writing medium cartridge (12, 22) arranged within the casing and comprising a writing tip (121, 221) at a distal end;
   - an actuating mechanism (30) configured to translate the writing medium cartridge (12, 22) between a first position and a second position;

a tubular elastic spring element (10, 20) configured to bias the writing medium cartridge (12, 22) in the second position;

wherein the spring element (10, 20) comprises:

a first portion (101, 201);

a second portion (102, 202);

wherein the second portion (102, 202) comprises a wall comprising a plurality of apertures (103, 203).

89. The writing instrument according to embodiment 88, wherein the first portion comprises a first material and the second portion comprises a second material, and wherein the first material is more rigid than the second material.

90. The writing instrument according to any of embodiments 88 to 89, wherein the spring element is arranged within the casing and around a portion of the writing medium cartridge.

91. The writing instrument according to any of embodiments 88 to 90, wherein, in the first position, the writing tip is situated within the casing.

92. The writing instrument according to any of embodiments 88 to 91, further comprising an actuation element (40) configured to actuate the actuation mechanism (30).

93. The writing instrument according to embodiment 92, wherein the actuation element is connected to the actuating mechanism.

94. The writing instrument according to any of embodiments 92 to 93, wherein the actuating mechanism is arranged within the casing.

95. The writing instrument according to any of embodiments 92 to 94, wherein the actuating mechanism is arranged at a proximal end of the writing medium cartridge.

96. A method of manufacturing a tubular elastic spring element for a writing instrument, wherein the tubular elastic spring element comprises:

a first portion (101, 201);

a second portion (102, 202);

wherein the second portion (102, 202) comprises a wall comprising a plurality of apertures; and wherein the method comprises an additive manufacturing process.

97. The method according to embodiment 96, wherein the first portion comprises a first material and the second portion comprises a second material, and wherein the first material is more rigid than the second material.

98. The method according to any of embodiments 96 to 97, wherein the second portion (202) of the spring element (20) comprises a wall comprising a plurality of apertures (203).

99. A method of simultaneously manufacturing a tubular elastic spring element (10) for a writing instrument and an elongated tubular casing (11) for a writing instrument, wherein the spring element (10) and the casing (11) form an integral part;

wherein the method comprises an additive manufacturing process.

100. The method according to embodiment 99, wherein the second portion (102) of the spring element (10) comprises a wall comprising a plurality of apertures (103), wherein the casing (11) comprises a wall comprising a plurality of apertures (112), wherein the plurality of apertures (112) of the casing (11) are facing the plurality of apertures (103) of the spring element (10), and wherein the plurality of apertures (112) of the casing (11) are a projection of the plurality of the apertures (103) of the spring element (10).

101. A method of simultaneously manufacturing by an additive manufacturing process a tubular elastic spring element (20) for a writing instrument and an elongated writing medium cartridge (22) for a writing instrument, wherein the spring element (20) and the writing medium cartridge (22) form an integral part;

wherein the method comprises an additive manufacturing process.

102. The method according to embodiment 101, wherein the second portion (202) of the spring element (20) comprises a wall comprising a plurality of apertures (203).

REFERENCE NUMERALS

1 writing instrument
2 writing instrument
10 tubular elastic spring element
11 elongated tubular casing
12 elongated writing medium cartridge
20 tubular elastic spring element
21 elongated tubular casing
22 elongated writing medium cartridge
30 actuation mechanism
40 actuation element
100 casing assembly
101 first portion
102 second portion
103 aperture
111 shoulder
121 writing tip
122 shoulder
200 cartridge assembly
201 first portion
202 second portion
203 aperture
221 writing tip
222 shoulder
223 groove

The invention claimed is:

1. A writing instrument comprising an elongated tubular casing, the casing comprising a wall with a plurality of apertures;

an elongated writing medium cartridge; and a tubular elastic spring element;

wherein the tubular elastic spring element comprises:

a first portion and a second portion, wherein the second portion comprises a wall comprising a plurality of apertures; and wherein the plurality of apertures of the casing face the plurality of apertures of the spring element, and/or wherein the arrangement and shapes of the plurality of apertures of the casing corresponds in projection to the arrangement and shapes of the plurality of apertures of the spring element.

2. The writing instrument according to claim 1, wherein the plurality of apertures is arranged as a net-like structure.

3. The writing instrument according to claim 1, wherein the first portion and the second portion form an integral part and wherein the first portion and the second portion are arranged longitudinally to each other.

4. The writing instrument according to claim 1, wherein the first portion comprises a first material and the second portion comprises a second material, wherein the first material is more rigid than the second material.

5. The writing instrument according to claim 1, wherein the spring element is manufactured by an additive manufacturing process.

6. The writing instrument according to claim 1, wherein the spring element and the casing form an integral part manufactured by an additive manufacturing process.

7. The writing instrument according to claim 1, wherein the spring element and the writing medium cartridge form an integral part manufactured by an additive manufacturing process.

8. A cartridge assembly for a writing instrument, the writing assembly including a tubular casing with a plurality of apertures, the cartridge assembly comprising:

an elongated writing medium cartridge comprising a writing tip at a distal end; and a tubular elastic spring element;

wherein the tubular elastic spring element comprises a first portion and a second portion, wherein the second portion comprises a wall comprising a plurality of apertures, and wherein the plurality of apertures of the tubular casing face the plurality of apertures of the spring element, and/or wherein the arrangement and shapes of the plurality of apertures of the tubular casing corresponds in projection to the arrangement and shapes of the plurality of apertures of the spring element.

9. The cartridge assembly according to claim 8, wherein the first portion and the second portion form an integral part and wherein the first portion and the second portion are arranged longitudinally to each other.

10. The cartridge assembly according to claim 8, wherein the first portion comprises a first material and the second portion comprises a second material wherein the first material is more rigid than the second material.

11. The cartridge assembly according to claim 8, wherein the spring element and the writing medium cartridge form an integral part manufactured by an additive manufacturing process.

12. The writing instrument according to claim 1, wherein the writing medium cartridge is arranged within the casing and comprises a writing tip at a distal end;

the writing instrument further comprising an actuating mechanism configured to translate the writing medium cartridge between a first position and a second position;

the tubular elastic spring element being configured to bias the writing medium cartridge in the second position.

13. A method of manufacturing a tubular elastic spring element for a writing instrument with an elongated tubular casing and an elongated writing medium cartridge, the elongated tubular casing including a wall with a plurality of apertures, wherein the tubular elastic spring element comprises:

a first portion and a second portion, wherein the second portion comprises a wall comprising a plurality of apertures, wherein the plurality of apertures of the tubular casing face the plurality of apertures of the spring element, and/or wherein the arrangement and shapes of the plurality of apertures of the tubular casing corresponds in projection to the arrangement and shapes of the plurality of apertures of the spring element, and wherein the method comprises an additive manufacturing process.

14. The writing instrument according to claim 1, wherein the spring element is configured to change from a relaxed state to a contracted state when it is subjected to a compression force in the longitudinal direction.

15. The writing instrument according to claim 14, wherein, in a first position, the spring element is in the relaxed state and, in a second position, the spring element is in the contracted state.

16. The writing instrument according to claim 1, wherein the writing medium cartridge comprises a shoulder on its outer surface and the second portion of the spring element faces the shoulder on the writing medium cartridge.

17. The writing instrument according to claim 16, wherein the shoulder of the writing medium cartridge comprises a groove directed in the longitudinal direction towards the distal end of the writing medium cartridge.

18. The cartridge assembly according to claim 8, wherein the second portion comprises a net-like structure.

* * * * *